(12) United States Patent
Keller et al.

(10) Patent No.: US 8,461,363 B2
(45) Date of Patent: Jun. 11, 2013

(54) DEODORIZATION AND STABILIZATION OF MARINE OILS

(75) Inventors: Andreas Keller, Rheinfelden (CH); Ingo Koschinski, Waldshut-Tiengen (DE); Albert Lustenberger, Füllinsdorf (CH); Neil MacFarlane, Augst (CH); Thomas Meierhans, Gipf-Oberfrick (CH)

(73) Assignee: DSM IP Assets B.V., Heerlen (NL)

( * ) Notice: Subject to any disclaimer, the term of this patent is extended or adjusted under 35 U.S.C. 154(b) by 372 days.

(21) Appl. No.: 12/598,968

(22) PCT Filed: May 9, 2008

(86) PCT No.: PCT/EP2008/003782
§ 371 (c)(1),
(2), (4) Date: Nov. 5, 2009

(87) PCT Pub. No.: WO2008/138575
PCT Pub. Date: Nov. 20, 2008

(65) Prior Publication Data
US 2010/0130610 A1    May 27, 2010

Related U.S. Application Data

(63) Continuation-in-part of application No. 11/798,496, filed on May 14, 2007, now abandoned.

(30) Foreign Application Priority Data

May 11, 2007   (EP) .................................. 07009539

(51) Int. Cl.
*C11B 3/00* (2006.01)
(52) U.S. Cl.
USPC ..................................................... 554/205
(58) Field of Classification Search
USPC ..................................................... 554/205
See application file for complete search history.

(56) References Cited

U.S. PATENT DOCUMENTS

| 3,506,696 | A | * | 4/1970 | Baker et al. .................... 554/205 |
| 4,810,330 | A |   | 3/1989 | Stage |
| 4,996,072 | A |   | 2/1991 | Marschner et al. |
| 5,436,018 | A | * | 7/1995 | Massie et al. ................. 426/417 |
| 6,666,436 | B1 | * | 12/2003 | Lerner ............................ 261/95 |
| 2003/0161918 | A1 |   | 8/2003 | Kendrick et al. |
| 2004/0022923 | A1 | * | 2/2004 | Hjaltason ..................... 426/601 |
| 2007/0082111 | A1 | * | 4/2007 | Macfarlane .................. 426/601 |

FOREIGN PATENT DOCUMENTS

| GB | 2 176 713 |   | 1/1987 |
| JP | 2007-14263 |   | 1/2007 |
| JP | 2007014263 | A * | 1/2007 |
| WO | WO 93/10207 |   | 5/1993 |
| WO | WO 2007/009591 |   | 1/2007 |
| WO | WO 2007009591 | A1 * | 1/2007 |

OTHER PUBLICATIONS

International Search Report for PCT/EP2008/003782 mailed Oct. 31, 2008.
Written Opinion for PCT/EP2008/003782 mailed Oct. 31, 2008.
Journal of the American Oil Chemists' Society, Online—C:/ EPOPROGS/SEA\.\..\.\epodata\sea\eplog . . . , Dec. 2007, 1 page, XP002461837.
Xu et al., "Purification of Specific Structured Lipids by Distillation: Effects on Acyl Migration", *J. American Oil Chemists Society*, vol. 78, No. 7, 2001, pp. 715-718.
D. Ahrens, "Industrial thin-film deodorization of seed oils with SoftColumn™ technology", *Fett/Lipid*, vol. 101, 1999, pp. 230-234.

* cited by examiner

*Primary Examiner* — Deborah D Carr
(74) *Attorney, Agent, or Firm* — Nixon & Vanderhye P.C.

(57) ABSTRACT

The invention relates to a process for the preparation of deodorized and stabilized food-grade marine oils by submitting marine oils to a counter-current steam distillation (CCSD) in a thin film column containing a structured packing and, if desired, adding antioxidant(s), to the food-grade marine oils thus obtained and to their uses in the food/feed, cosmetic and/or pharmaceutical industry.

13 Claims, No Drawings

DEODORIZATION AND STABILIZATION OF MARINE OILS

This application is the U.S. national phase of International Application No. PCT/EP2008/003782 filed 9 May 2008 which designated the U.S. and claims priority to European Patent Application No. 07009539.3 filed 11 May 2007, which is a continuation-in-part of U.S. patent application Ser. No. 11/798,496 filed 14 May 2007 (now abandoned), the entire contents of each of which are hereby incorporated by reference.

The present invention relates to a process for the deodorization and stabilization of marine oils and to the marine oils thus obtained.

Marine oils have attracted substantial interest as a source of polyunsaturated fatty acids (PUFAs), particularly eicosapentaenoic acid (EPA) and docosahexaenoic acid (DHA) are of dietary significance, including PUFA esters, in the form of their naturally occurring glycerides as well as in the form of ethyl esters. However, depending on their origin, the degree of their purification and elimination of naturally occurring by-products as well as of deterioration products the quality of marine oils in terms of taste and stability varies considerably. Since PUFAs contain several carbon-carbon double bonds, they are prone to oxidation under atmospheric conditions and development of a fishy taste and smell.

Today there is a lot of convincing evidence that increasing dietary levels of these compounds have beneficial effects on health and can reduce the incidence of death from coronary heart diseases via effects on blood pressure, atherosclerosis and thrombogenesis.

The increasing interest in these compounds has prompted a research into methods of stabilizing fish oils against oxidation and off-flavor development.

Recently there have been many improvements in stabilizing marine oils and PUFAs by the addition of stabilizing substances.

Hamilton et al., J. Am. Oil Chem. Soc. (JAOCS), 75(7), 813-822 (1998), disclose a very good ternary additive mixture (2% γ-tocopherol, 0.1% ascorbyl palmitate, 0.5% lecithin) to prevent autoxidation of fish oils. While refined fish oil after addition of this mixture showed no significant peroxidation at 20° C. over a period of 6 months the mixture was not very successful in preventing off-taste and off-smell. Off-flavors developed within 3 weeks.

EP 340 635 A describes a process of treating oils, especially fish oils, containing EPA and DHA by vacuum steam distillation under mild conditions (between 30° C. and 150° C., preferably 60-100° C., for 2-5 hours) to reduce low temperature boiling and less polar volatile flavour compounds and contacting said oil with an adsorbent, e.g., silica gel, to reduce high temperature boiling and more polar volatile flavor compounds. In a specific embodiment the thus purified oil is combined with a rosemary extract antioxidant. Such oil with considerably reduced fishy off-taste and off-smell development, however, is characterized by rosemary extract taste and smell which renders it unsuitable for many food applications, especially in dairy products.

Refined marine oil which has been treated with silica, submitted to soft vacuum steam distillation (140-210° C.) and stabilized with a mixture of lecithin, ascorbyl palmitate (AP) and alpha tocopherol in accordance with the procedure described in European patent application 612 346 (=WO 93/10207) shows improved rancimat stability (according to Examples 1-8:4.9-14 hours at 100° C.) and good application performance mainly for health food supplements. However, still in dairy applications such as yoghurts and milk drinks, which are particularly sensitive to smell, the development of unacceptable unpleasant smell and taste was observed on some occasions.

EP 999 259 (=US 2003/161918 A1) describes the preparation and stabilization of PUFA-containing food-grade marine oils by a process which comprises treating a marine oil with silica, submitting it to a 2 hours batch vacuum steam deodorization at temperatures of 150° C. and 190° C. in the presence of rosemary or sage extract and, if desired, addition of ascorbyl palmitate and mixed tocopherol. This procedure provides stabilized food grade marine oils with excellent smell and taste characteristics and a rancimat induction time value of 4.1 to 6.2 hours. The quality of these oils is so far the best obtainable and renders them suitable for various food applications including dairy products, e.g., milk and yoghurts.

In view of the constantly increasing need of PUFA-containing high quality food-grade oils a more efficient method of production in terms of volumes and shorter time is desirable. Such a method and corresponding products are provided by the present invention.

According to Ullmann's Encyclopedia of Industrial Chemistry, $5^{th}$ edition, Vol. A10, p. 204-206 (1967), semi-continuous and continuous deodorization systems are replacing batch deodorizers because of savings in steam resulting from more efficient stripping and heat recovery. Examples of semi-continuous and continuous deodorizers consisting of iron shells fitted with stainless steel trays and their providers are mentioned. A Campro deodorizer has a continuous tray-in-shell design that combines plug flow with a unique thin-film stripping concept.

The development of commercial deodorizing systems from the beginning until the early nineties is reviewed in chapter 6 (Deodorization) of volume 4 of Bailee's Industrial Oil and Fat Products, edited by Y. H. Hui, John Wiley & Sons, New York, 1996, pp. 339-390.

U.S. Pat. No. 4,996,072 discloses a method of deodorizing and/or reducing the cholesterol level of fats and oils, particularly fish oils or marine oils, by a multiple step process under vacuum which comprises heating such oil to a temperature of about 400-550° F. (204-288° C.), flash vaporizing said heated oil yielding a par-treated oil liquid phase which oil is then thin-film stripped with 1-15% (by weight) counter-current steam at 1-7 mmHg. Thus, a clean oil is obtained characterized by the bland flavour of clean fish oil, with reduced cholesterol content and at least 95% of the n-3 unsaturated fatty acid content of the starting material.

Similarly, closely related U.S. Pat. No. 5,436,018 discloses that by a method for reducing the cholesterol level of an oil, particularly a fish oil or marine oil, comprising introducing such oil at a temperature of at least 400° F. (204° C.) and a pressure of at least 1 mmHg at an upper portion of a counter-current thin-film steam stripper while simultaneously introducing steam at a lower portion thereof, there is obtained an oil which is reduced in cholesterol, is deodorized and which has a good flavour. In view of the short residence times of the oil of five minutes or less this process is said to be advantageous compared to conventional deodorization techniques since degradation of the beneficial n-3 unsaturated fatty acids is minimized.

U.S. Pat. No. 4,810,330 describes a specific embodiment of a continuous deodorizing process for relatively small charges of high boiling liquids such as fatty acids, edible oils, fats, glycerides and other high-boiling esters, particularly palm oil and other vegetable oils which in addition to the fatty acid glycerides contain about 5 wt.-% of light ends (free fatty acids, water, pigments, odorous and/or flavouring compounds), by contacting a falinf film of the liquid with a continuous stripping stem in a counter-current column.

Similar methods and apparatuses for removing volatile impurities from/deodorizing of/physically refining of high boiling edible oils, fats and esters, particularly vegetable oils and hydrogenated fish oils by counter-current steam stripping in falling film columns are known from, e.g., U.S. Pat. No. 4,394,221, U.S. Pat. No. 4,599,143 and GB 2 176 713 A (=DE 35 22 897 A1).

JP 2007 014263 A describes the purification of edible fats and oils of vegetable and animal origin, including fish oils (unpurified, deacidified, decolourised, deodorised, hydrogenated), with a trans-fatty acid content of not greater than 1% by mass by a combination of thin film column containing stacked-packing material and tray type apparatuses. Temperature inside the column is from 225 to 252° C., the pressure is not greater than 18 hPa, the oil load is from 12 to 28 $m^3/m^2 \cdot hr$ and the transfer unit height of the regulation filler is 1-7 m. The temperature inside the tray device is from 210 to 247° C., the pressure is not greater than 18 hPa. The purification treatment time is from 15 to 120 minutes.

Xu et al. (JAOCS, 78(7), 715-718 [July 2001]) have investigated the cause and effects of acyl migration during the purification of specific structured lipids by distillation in a conventional batch deodorizer with stripping steam. Results indicated that more efficient separation technology should be used to improve the quality of purified structured lipids and conclude that in order to reduce the distillation temperature, vacuum should be made as low as possible and in order to reduce the distillation time, thin-film principle in a packed column should be used.

Ahrens in Fett/Lipid 101(7), 230-234 (1999), WILEY-VCH Verlag GmbH, Weinheim, reviews the history of thin-film deodorization of seed oils. Development of thin-film deodorizers started in the 1970ies and they have been in industrial use since the middle of the 1980ies. The latest type is the SoftColumn™, a deodorizer specially developed for mild, low cost processing of seed oils, particularly sunflower, soybean and rapeseed oils, comprising a structured packing. The extremely effective stripping of free fatty acids leads to shorter overall holding times of the oil under vacuum at elevated temperature and to a reduction of steam consumption to a third of the amount required by conventional deodorizers. The oil obtained has low acidity, low colour, good taste and stability and low trans fatty acid levels. Through the superior distillation efficiency of structured packings it is possible to trim the deodorizer both for tocopherol removal or tocopherol retention simply by adjusting the stripping steam. Superiority of thin-film stripping using packed columns to tray stripping systems on the one hand and of structured packings to random-dumped packings on the other hand in thin-film deodorization of edible seed oils had already been found by Stenberg et al. (INFORM, 7 (12), 1296-1304, December 1996).

WO 2006/1185518 describes a semi-continuous or continuous method for deodorizing organic or inorganic fluids in a column having one or more trays by contacting the fluid with a sparging gas which can be water vapor, preferably introduced at the bottom level of the trays.

The Sulzer Company on their website (www.sulzerchemtech.com) offers plants comprising packed columns containing structured packings for the preparation of edible fat and for oil deodorization by removal of free fatty acids from vegetable oils at a very low vacuum. Sulzer also offers different kinds of structured packings of different materials useful in such columns.

These structured column packings provide for an even distribution of the liquid oil phase over a large surface as a thin film so that an intensive contact with the gaseous phase and material exchange is achieved. This is the reason why deodorization processes using such columns under vacuum steam counter-current conditions are much more efficient than corresponding batch processes.

While the contact time between oily and gaseous phase in a batch deodorization process is normally several hours it is in the range of minutes in a counter-current steam distillation (CCSD) process. However, as shown in EP 999 259, in a batch deodorization in the presence of a herbal extract, e.g., rosemary or sage extract, the active deodorizing and stabilizing components of such extract are not removed while the herbal smell and taste components as well as the components responsible for the development of fishy smell and taste are removed from the marine oil. It was not to be expected that under the conditions of a highly more efficient CCSD the same would happen, namely that from a marine oil to which a herb extract deodorant and optionally antioxidants have been added the deodorizing and stabilizing components under the conditions of a CCSD would not also be removed together with the herbal smell and taste components and the fishy smell and taste components. It was surprising to find that submitting such oils or marine oils in the presence of herbal extract deodorants to a CCSD yielded food-grade oils of high quality, i.e., characterized by very good smell and taste quality, a high rancimat induction time and low FAST indices.

The present invention, therefore, relates to a process for the preparation of deodorized and stabilized food-grade marine oils (compositions) which process comprises submitting a marine oil to a counter-current steam distillation (CCSD) in a thin film column containing a structured packing, preferably in the presence of herbal extract deodorants, and, if desired, adding anti-oxidant(s), e.g., ascorbyl palmitate and/or tocopherol and/or citric acid. The term "marine oil in the presence of herbal extract deodorants" comprises marine oil containing herbal extract deodorants or herbal extracts and marine oils to which herbal extract deodorants or herbal extracts have been added.

The present invention also relates to the deodorized and stabilized food-grade marine oils (compositions) obtained or obtainable by this process, to their use as dietary or health supplements and for the manufacture of preparations such as food applications, fortified food (functional food) as well as to the dietary and health supplements and the food fortified with these marine oils themselves.

The term "marine oil" as used herein is to be interpreted broadly and comprises oils from marine organisms which include algae, plankton, fish, preferably cold water fish and seal, including genetically manipulated/transformed organisms, as well as parts or fractions and components of such marine oils containing at least one long-chain (LC) PUFA. In its broadest sense the term "marine oil" comprises oils obtainable from any organism which oils may upon degradation give rise to the occurrence of aldehydes and ketones responsible for development of "fishy" or other unpleasant smell and taste. Such organisms include animals, microorganisms (e.g., yeasts) and plants as well as parts of the foregoing, e.g., seeds.

The term "polyunsaturated fatty acid (PUFA)" relates to n-3, n-6 and n-9 (or omega-3, omega-6 and omega-9) fatty acids, preferably n-3 fatty acids, with at least two C—C double bonds and esters thereof with glycerol or alkanols, preferably lower alkanols such as ethanol. Examples of LC n-6 PUFAs are linoleic acid (C18:2), γ-linolenic acid (GLA, C18:3), dihomo-γ-linolenic acid (DGLA, C20:3) and arachidonic acid (ARA, C20:4). Examples of LC n-3 PUFAs are α-linolenic acid (C18:3), octadecatetraenoic acid (C18:4; 6, 9, 12, 15), eicosapentaenoic acid (EPA, C20:5; 5, 8, 11, 14, 17), docosapentaenoic acid (DPA, C22:5; 7, 10, 13, 16, 19) and docosahexaenoic acid (DHA, C22:6; 4, 7, 10, 13, 16, 19). Especially EPA and DHA have attracted interest of the food industry during the last years and marine oils containing them in form of their glyceryl, or alkyl, e.g., methyl or ethyl, esters, particularly in concentrated form, are of preferred interest in connection with the present invention. The PUFA glycerol esters—which can be natural or reconstituted—comprise mono-, di- and tri-glycerides, the latter being of particular interest. Methyl or ethyl esters are obtained from marine oils by transesterification.

The marine oil or fraction thereof which is used as starting material in the process of the present invention may be an unrefined, a degummed, deacidified, neutralized, partly oxidized, partly refined, refined, bleached and/or deodorized marine oil to which a herbal extract deodorant has been added, e.g., rosemary or sage extract. Preferred starting materials have undergone pre-refinement, such as adsorption on silica with or without carbon and/or short path distillation. The amount of the herbal extract to be added before the CCSD depends on its quality. The chemical nature of the components responsible for the deodorizing power of the herbal extracts and the mechanism(s) of their action are not clear today. With amounts in the range of 0.1-0.4% (w/w) of deodorized rosemary or sage extract excellent results are obtainable. However, this range is not a limitation. Optimal amounts can be determined on a case-by-case basis. In case of PUFA ethyl esters, e.g., with 250 ppm Herbalox still good rancimat values were obtained.

The deodorized and stabilized food-grade marine oils are characterized by a low number in the FAST Index™, viz., below 2 or 1.5, preferably between 1 and 2; 1 and 1.5; 1 and 1.3; more preferably between 1 and 1.1 and most preferably by a number of 1.0. The index correlates exactly with trained taste panels to give a scale for fishy-ness. The acronym "FAST" stands for "Fatty Acid Smell and Taste". The method combines automated solid phase micro extraction (SPME) of smell molecules and ammonia negative chemical ionization mass spectrometric detection. This makes it possible to measure the concentrations of 3 specific molecules (4-heptenal, 2.6-nonadienal and 3.6-nonadienal) which confer fishy taste and smell. An algorithm converts the data into a score which reflects these concentrations. The FAST Index™ has been calibrated with human taste panels such that a score of 1-7 reflects the range of taste sensitivity experienced by human subjects. A score of 1 indicates a complete lack of fishy taste (i.e. "not"), a score of 2 "very slightly", a score of 3 "slightly", a score of 4 "middle", a score of 5 "strong", a score of 6 "very strong", whereas a score of 7 indicates an extreme fishy taste. Although the human taste sensation is saturated at a score of 7 or little above, the FAST Index™ can measure taste and smell molecules up to a score of several hundred. In the journal INFORM (12, 244-249, March 2001) of the American Oil Chemists' Society N. Macfarlane et al. have called for a test to quantify fish flavor, described the FAST Index™ technique and disclosed the algorithm by which the analytical data is converted into the score. The following algorithm has been developed: Fish taste index=$1+(0.312 \times A)+(0.11 \times B)+(0.03 \times C)$, wherein A=2.6-nonadienal (ppb), B=4-heptenal (ppb) and C=3.6-nonadienal (ppb).

Since 2.6-nonadienal, 3.6-nonadienal and 4-heptenal among others are the essential molecules that contribute to the unwanted smell and/or reduced stability in marine oils and are measured in the FAST index the removal (complete or to a high degree) of these compounds is a specific embodiment achieved by the present invention. By the present method FAST indices of 1.0 for marine oils are obtainable, representative for a quality not obtained before.

Therefore, a further embodiment of the present invention is the removal or reduction of these molecules to concentrations that the FAST Index™ is 1.0 wherein it is to be understood that 1.0 is less than 1.1 but comprises 1.01.

In addition to the three molecules described in the FAST test there are other aldehydes and ketones that have different flavour attributes and that can contribute to off-flavour if present in analytically ascertainable amounts. These molecules include alkanals (pentanal—blue cheese; hexanal—cut grass; heptanal—chemical, unpleasant; octanal—chemical, plastic; nonanal—chemical, plastic), alkenals (2-hexenal—bitter; 2-heptenal—bitter; 2-octenal—nutty; 2-nonenal—chemical, unpleasant), alkadienals (2,4-heptadienal—rancid; 2,4-nonadienal—rancid) and ketones (1-penten-3-one—chemical, plastic; 1-octen-3-one—mushroom; 3,5-octadien-2-one—metallic). Their reduction to below sensory thresholds is of importance to produce a bland oil and quantitative determination of presence or absence of these compounds may be helpful to differentiate the deodorized and stabilized marine oils of the present invention from prior art stabilized/deodorized marine oils. In the present food-grade marine oils these components are reduced to limits of detection.

On the other hand the stability of a marine oil is given by its Rancimat induction time (RIT) value. This value represents the time interval in hours until the oil reaches the onset of rancidity. The value is measured using a Rancimat® apparatus (Metrohm Ltd., CH-9101 Herisau, Switzerland) at 100° C. From this value measured at high temperature the stability of the oil at lower temperatures, e.g., 20° C. or 10° C. can be extrapolated. The marine oils of the present invention are characterized by a rancimat stability at 100° C. of more than 2, preferably more than 3.8, more preferably more than 5.2, 6 or 6.2 and most preferably in the range of 10.15-20 hours.

In a further embodiment of the invention the marine oils of the present invention are further processed into powders, premixes, granulates, beadlets, supplement forms, tablets, pills, lotions, solutions or emulsions in accordance with known techniques.

Compositions and preparations or formulations containing/on the basis of a marine oil of the present invention can further comprise organic carrier molecules common in food, animal feed, cosmetic or pharmaceutical formulations.

As described above stabilization of marine oils through the addition of stabilizers/antioxidants are methods of the state of the art and in combination with the present invention are preferred embodiments of the invention. Particular examples of stabilizers include ascorbic acid, ascorbyl palmitate, BHT, t-butyl-hydroquinone (TBHQ), rosemary extracts, e.g., Herbalox "O" from Kalsec, Inc., Kalamazoo, Mich., sage extracts, tocopherols, lecithins and citric acid.

The invention provides a breakthrough in industrial processes for the preparation of stabilized and deodorized marine oils. By the use of thin-film counter-current technique there is a considerable increase in the amounts of oil produced per time unit. Depending upon the column dimensions used amounts of more than 10 kg per hour can be achieved. Preferably, the yield of product is more than 100 kg per hour or even 1000 kg per hour which represent industrially meaningful quantities of marine oils or fractions of marine oils. Preferred packaging sizes include samples of more than 4 kg, preferably of more than 19 kg, more preferably of more than 170 kg, and most preferably of more than 900 kg.

All kinds of thin film columns containing structured packings, particularly highly efficient structured packings, by which thin films of a marine oil to be deodorized and stabilized are provided and are thus brought into intensive contact with the gas phase (steam) can be used in the practice of the present invention. There are many structured packagings of different materials known for such thin film columns. In one particular embodiment a corrugated sheet metal packing provides for excellent results. Among a multitude of commercially available packed columns which are useful in the process of the present invention the following packings are mentioned specifically as examples: Sulzer Mellapak, Sulzer Mellapak Plus, Sulzer gauze types BX, BX Plus or CY, Sulzer Mellagrid, Nutter grid, Kühne Rombopak or Zehua Sepak, uses of which represent a preferred embodiment of the present invention.

The contacting with steam can be done in a variety of ways. However, in one particularly effective way, the marine oil or fraction of a marine oil is added on top or upper part of the column and the steam is added at the bottom or lower part thus running the column in counter-current modus.

While the invention can be performed as a batch-type or semi-continuous process, it is preferred to run the process in a continuous manner. In one specifically preferred embodiment of the invention the column is operated as a continuous counter-current steam column and the process is a counter-current steam distillation (CCSD).

The inventors assume that the number of theoretical stages in the thin film column has an influence on the quality of the process. In one preferred embodiment the thin film column containing a highly efficient structured packing is operated with an NTS (number of theoretical stages) of more than 10, preferably more than 50 and more preferably with about 60 or between 60 and 100. It is particularly preferred that the column has no physical plates at all, although it is currently believed that 1 physical plate will not reduce the advantages of the process of the invention and even 2 physical plates are acceptable.

It has been observed that the difference in pressure (pressure drop) between the top of the column and the bottom of the column has in some instances an influence on the composition that is produced. Therefore in a preferred embodiment of the invention the pressure drop between bottom and top of the column is less than 2 mbar/m, preferably between 0.01 and 1 mbar/m and more preferably between 0.8 and 1.0 mbar/m.

It has also been observed that the ratio between the marine oil and the steam provides for differences in the results of the process. It is currently preferred in some embodiments to operate the thin film column at a marine oil to steam ratio (w/w) between 1000:1 to 10:1, preferably 500:1 to 20:1, more preferably 200:1 to 50:1, and most preferably 160:1 to 70:1. Actually, very good results are obtained with a ratio of 120:1.8.

The current process provides for effective usage of raw materials. It has been observed that it can reduce the waste considerably. It is, of course, evident that the nature and quality of the raw material has an influence on the mass balance. In preferred embodiments, e.g., when starting from an already refined marine oil, the mass balance of the marine oil, i.e., the difference between before and after having been contacted with the steam, is less than 5% by weight.

The metric dimensions of the column have an impact on the economics of the process. It is preferable to use columns containing 0.5 to 20 m, preferably 1 to 12 m, more preferably 2-10 m and most preferably more than 7 m of active structured packings. It is an essential advantage of the present invention that the average contact time of the marine oil with the steam is relatively short and, consequently, the production time per unit of deodorized and stabilized marine oils in accordance with the present process is considerably shortened.

One reason is the relatively short residence time of the marine oil in the thin-film column. In preferred embodiments of the invention the residence time of the liquid phase in the column is between 0.5 and 60 minutes, more preferably between 5 and 30 minutes, 2 and 20 minutes or 5 and 10 minutes. It is especially preferred to have a residence time of the gas phase in the column of between 0.5 and 10 seconds.

There is a variety of marine oils that can be stabilized by submitting them to the process of the present invention. Preferred marine oils are oils from fish which include menhaden herring, sardine, anchovy, pilchard, tuna, hake, catfish, capelin, red fish, white fish, mackerel, jack mackerel, sand eel, pout, salmon, pollock, cod, halibut, trout, capelin, blue whitening, sprat, dogfish, etc., and mixtures of such oils.

The invention does not only relate to the stabilization and deodorization of complete oils directly obtained from marine organisms but also to fractions of marine oils. It is apparent for the skilled person that there are various qualities of marine oils available as raw materials for this process which qualities are dependent on their age. Some may have already undergone one or more purification steps before they are processed according to the process of the present invention. Therefore, the starting or raw materials for the process of the present invention comprise unpurified, unrefined marine oils, degummed marine oils, deacidified marine oils, decolourized, partly and completely refined marine oils, neutralized marine oils, bleached marine oils, stabilized and/or deodorized marine oils and mixtures thereof. In the most preferred embodiment of the present process the raw materials have undergone adsorption on silica and contain already herbal extract deodorants or such herbal extract deodorants are added to them more or less immediately before submitting them to the present process.

In one particular embodiment of the invention the marine oil is a food oil and comprises polyunsaturated fatty acids in form of their glycerides, mainly triglycerides, naturally occurring or reconstituted. The oil is fed and treated at a temperature of between 80° C. and 250° C., preferably between 100° C. and 230° C., more preferably between 180° C. and 220° C.

In another embodiment of the invention the marine oil comprises polyunsaturated fatty acids in form of alkyl esters, preferably methyl or ethyl esters, and is fed and treated at a temperature of between 60° C. and 200° C., preferably between 80° C. and 180° C., more preferably between 105° C. and 150° C. or between 120° C. and 160° C.

The temperature of the steam is between 100° C. and 290° C., preferably between 140° C. and 160° C.

While the process can be operated under normal pressure it is obvious that the process works best under reduced pressure. Therefore, in a preferred embodiment the thin film column is run under a pressure of between 0.1 and 10 hPa, preferably between 0.5 and 10 hPa and more preferably between 1 and 5 hPa.

A variety of additional routine process steps can be performed in connection with the execution of the process of the present invention. One preferred step is degassing. In a special embodiment of the invention the process comprises degassing the marine oil, preferably before contacting it with the steam, to less than 1 ppm (by volume of the marine oil) of $O_2$, preferably to less than 0.5 ppm.

Another special favourable measure is the evaporation of water. It is an improvement to evaporate the marine oil, preferably shortly before contact with the steam, to less than 50 ppm water (based on the weight of the marine oil), preferably to between 1 and 50 ppm of water.

The steam should be free of oxidizing components, e.g., $O_2$. It has been found that steam from normal tap water is sufficient.

In specific embodiments of the present invention stabilizers, e.g., antioxidants, and/or additional deodorants, e.g., herbal extracts, can be added after the deodorizing process.

The marine oils of the present invention can advantageously replace PUFA-containing marine oils as such and in compositions and preparations or formulations, nutritional supplements and dietetic or fortified/functional food of the state of the art and on the marketplace in view of their advantageous organoleptic qualities and high stability. The main market for deodorized and stabilized marine oils of the present invention is the food market. But it is also conceivable that there are interesting aspects of applications in the feed market. The pet food market is also of interest in the context of the present invention. There are several applications contemplated in the cosmetic and pharmaceutical markets as well. In a preferred embodiment of the invention the compositions obtained according to the process of the invention can be used as health supplements and may be contained in food applications. A special field of interest in pure and stable marine oils are dairy products, infant nutrition products or baby food products. Specific examples include beverages or cereals. The compositions can be applied advantageously in milk, yoghurts and fruit juices which products are most sensitive to alterations in taste and smell in view of oxidation and degradation of marine oil components.

The present invention, therefore, also relates to dietary or health supplements as well as fortified or functional food containing a deodorized and stabilized food-grade marine oil according to the present invention and a process for the preparation of such products, which are rich in n-3 PUFA(s).

The marine oils of the present invention which are rich in PUFAs, especially n-3 or ω-3 PUFAs, particularly EPA and DHA, can be used advantageously for the production of a dietary, health or nutritional supplement or food fortified with n-3 fatty acids (functional food) in accordance with known methods, e.g., as described in US2007/0298079. In accordance with such method a fortified food is produced from an intermediate food product or its components by adding to it/them an amount of the marine oil in liquid form, as such or in form of an emulsion or a gel or in dry form, e.g., as powder, encapsulated in a matrix, containing the desired amount of n-3 fatty acid(s), normally 5-5000 mg, preferably at least 16 mg per serving of the food product, dispersing it by intensive mixing and, if desired, further processing and post-processing the substantially homogeneous blend thus obtained into the desired product. The intermediate food product may be a juice (FC or NFC), e.g., citrus juices, non-citrus juices, dairy drinks, energy drinks, sports drinks, fortified/enhanced water drinks, soy drinks, fermented drinks, carbonated drinks, mixtures of such juices and drinks, yoghurt, oatmeal, cereals, cakes, snack bars, puddings, cheese and combinations thereof. Further processing and post-processing is effected in accordance with methods well-known in the art and includes, e.g., pasteurization and cooling or filling into containers and packaging, respectively.

In another specific embodiment marine oils of the present invention can be used in a method for the manufacture of a liquid nutritional and refreshing preparations, e.g., orange juices, of the type described in WO 0147377 and EP 1 241 955, contents of which documents are incorporated by reference into the present specification. Refreshing preparations as described therein and similar ones with respect to their qualitative and quantitative composition are exemplary of food applications of the marine oils of the present invention.

The present marine oils can also be part of and useful in the manufacture of dietetic compositions and food preparations comprising in addition to such oils at least one dietary fiber, such as resistant starch, fructooligosaccharides, oligofructosides and inulin in the context of reduced-fat diets with the purpose of weight reductions or weight control as described, e.g., US 2007/0010480, contents of which document is incorporated by reference into the present specification. Dietetic compositions and food preparation thereof with the at least one n-3 fatty acid component is a present marine oil are also exemplary of dietary or health supplements and fortified/functional food of the present invention.

Finally, examples of another specific embodiment of the present invention are nutritional supplements and functional food as described in WO 2006/117164, contents of which document is incorporated by reference into the present specification, wherein the n-3 fatty acid source is a marine oil of the present invention and which in addition comprise at least one nut oil and a flavor carrier, such as salad dressings.

It is worth while mentioning that there are various applications known in the industry where citrus flavors are added to compensate for off-smell and -taste of marine oils and/or fractions of marine oils and/or PUFA's and PUFA (alkyl) esters and (tri)glycerides. While the final products obtainable in accordance with the present invention do not need such additives combinations with citrus flavors including citric acid are encompassed. In fact it is preferred not to add citrus flavors because they may interfere with the natural defense mechanism of the human body in the detection of spoiled food.

Finally, the marine oils of the present invention can be used for the preparation of galenical formulations in the cosmetic and pharmaceutical industry in accordance with well-known methods.

The invention is illustrated further by the following examples without being limited thereto.

EXAMPLE 1

A distilled ethyl-ester concentrate of a marine oil was subjected to a counter-current steam distillation in a thin film column (length: 8 m; diameter: 250 mm; stainless steel column with Sulzer BX gauze packing) under the following operation conditions:

Temperature: 150 C; pressure: 1-2 mbar; oil feed rate1: 100 kg/h; steam feed rate: 1.8 kg/h.

Various ethyl ester concentrates of marine oils treated under these conditions have shown excellent sensory properties and rancimat stability (see Table 1), which can be further enhanced by addition of stabilizers comprising antioxidants.

As is common in the industry the oils obtained were evaluated for stability on a Rancimat® apparatus (Metrohm Ltd., CH-9101 Herisau, Switzerland) at 100° C. The measured value represent the time interval in hours until the oil reaches the onset of rancidity.

Table 1 shows the oxidative stabilities of several commercially available n-3 PUFA ester products and of the product obtained according to Example 1

| Sample | Rancimat stability at 100° C. (hours) | Predicted stability in air at 20° C. (hours/days) | Predicted stability in air at 10° C. (days) |
| --- | --- | --- | --- |
| Croda 3322EE | 0.4 | 102.4/4.3 | 8.6 |
| Triomega | 0.8 | 204.8/8.6 | 17.2 |
| Esapent | 0.5 | 128/5.3 | 10.6 |
| Croda 4020EE | 1.1 | 281.6/11.7 | 23.4 |
| ONC 4020EE - unstabilised | 0.4 | 102.4/4.3 | 8.6 |
| EPAX 6000EE (4020) | 0.9 | 230.4/9.6 | 19.2 |
| ONC4020EE stabilised | 1.1 | 281.6/11.7 | 23.4 |
| Ropufa 75EE | 1.8 | 460.8/19.2 | 38.4 |
| Example 1 | 4.0 | 1022/42.7 | 85.3 |

EXAMPLE 2

A partly refined marine oil was preheated in a thin film evaporator at 150° C. and under reduced pressure of 30 mbar. Immediately thereafter the oil was subjected to a countercurrent steam distillation in a thin film column (length: 8 m; diameter: 250 mm; stainless steel column with Sulzer BX packing) under the following conditions: Temperature: 210° C.; pressure:1-2 mbar; oil feed rate: 100 kg/h; steam feed rate: 1.8 kg/h.

The oil was cooled after steam treatment and FAST Index values were measured (see Table 2). The equation used is the following: Fish Taste (FAST) Index=1+(0.31 A)+(0.11 B)+ (0.03C), with A=2,6-nonadienal, B=4-heptenal, C=3,6-nonadienal (in ppb).

With this model it is possible to give a good sensory picture of the samples prepared according to the process of the invention and of several commercially available products. Commercially available oils (glycerides) which are more stable than (alkyl)ester concentrates have FAST Index values in the range 20-100 and ester concentrates have values in the range 60-2500. This means that all of these products can be fishy even though oxidation may not be more than a few ppm. It explains why the "repeat" phenomenon is common with n-3 supplements and why many problems occur in the processing and consumption of these products.

Table 2 gives FAST Index values of commercially available ester concentrates and reconstituted triglycerides and of samples obtained according to the present invention

| Sample | FAST Index Value |
| --- | --- |
| EPAX 6000EE (4020) | 2068 |
| EPAX 6000TG | 2396 |
| EPAX 4510TG | 1997 |
| EPAX 1050TG | 1531 |
| Croda 3322EE | 111 |
| ONC 4020EE | 125 |
| Croda TG3322 | 82 |
| Croda TG0525 | 1073 |
| Ropufa 75 EE | 2-3 |
| Example 1 | 1.5-2 |
| Ropufa Food oil | 1.5 |
| Example 2 | 1-1.3 |

Further experiments have been done by mixing material from Example 2 with antioxidants to improve the oxidative stability of these products and some results are recorded below. It is clear to the person skilled in the art that this selection is not limiting the scope of the invention.

TBHQ has long been known to be a powerful anti-oxidant. Unexpectedly we have found it to be a strong synergist with rosemary oil. Ropufa® food oil containing 0.2% rosemary extract, 200 ppm ascorbyl palmitate and 1000 ppm mixed tocopherols has a Rancimat induction time of 5.4 hours at 100° C. If the tocopherol is replaced by 200 ppm of TBHQ the induction time increases to over 10 hours at 100° C.

Results for the oxidative stabilities of Ropufa® food oil containing different combinations of herb phenolics and TBHQ are given below in Table 3. In every case the Rancimat induction time (RIT) of 4 hours is exceeded.

Table 3 Rancimat stabilities of stabilized PUFA oils and esters

| Antioxidant system | Inclusion levels | RIT [hrs] at 100° C. |
| --- | --- | --- |
| HQ | 100 ppm | 4.6 |
| TBHQ | 200 ppm | 8.3 |
| TBHQ | 200 ppm | 6.9 |
| Ascorbic Acid | 200 ppm | |
| TBHQ | 200 ppm | 9.4 |
| Herbalox | 0.20% | |
| TBHQ | 200 ppm | 9.2 |
| Herbalox | 0.20% | |
| Ascorbic acid | 200 ppm | |
| TBHQ | 200 ppm | 10.2 |
| Herbalox | 0.20% | |
| Ascorbyl palmitate | 200 ppm | |
| TBHQ | 100 ppm | 5.6 |
| BHT | 100 ppm | |
| TBHQ | 200 ppm | 4.0 |
| Robertet Herbor L5 | 0.20% | |
| TBHQ | 200 ppm | 6.2 |
| Rosemary viscous | 0.40% | |
| TBHQ | 200 ppm % | 7.4 |
| Rosemary powder | 0.15% | |
| Sage viscous | 0.10% | 7.2 |
| TBHQ | 200 ppm | |
| Sage viscous | 0.10% | 6.0 |
| TBHQ | 200 ppm | |
| Ascorbyl Palmitate | 200 ppm | |
| Sage viscous | 0.10% | 8.4 |
| TBHQ | 200 ppm | |
| Citric acid | 200 ppm | |

EXAMPLE 3

(A) Marine Oil Type DHA for ROPUFA '30' n-3 Food Oil from Smit & Zoon, NL, having the following specification:

| Appearance: | yellowish oil |
| --- | --- |
| Colour (Gardner): | max. 11 |
| Taste: | acceptable |
| Odour: | very faint fish-like |
| Acid value: | max. 0.5 (mg KOH/g oil) |
| Peroxide value: | max. 5.0 (mEq/kg oil) |
| p-Anisidin value: | max. 30 |
| Unsaponifiable: | max. 2.0% |
| DPA content: | max. 1.0% |
| EPA content: | min. 10.5% |
| DHA content: | min. 16.0% |
| Total n-3 fatty acids: | min. 30.0% |
| Total n-3 long chain PUFAs: (DPA + EPA + DHA) | min. 25.0% |
| Vitamin A: | max. 100 IU/ml |
| Vitamin D3: | max. 50 IU/ml |
| Cholesterol: | max. 0.5% |

(B) The above marine oil has been fully refined (degummed, bleached and deodorized by standard oil refining procedures). For the purpose of producing a bland and stabilized marine oil for human consumption, however, it is designated crude and has to go through additional steps to become suitable for food application.

(C1) Adsorption on Silica 500 kg of raw marine oil were fed under nitrogen into a 1000 l vessel. To that 5% (w/w) Silika was added and agitation was started. The pressure in the vessel was reduced to 40 hPa. As soon as 100 hPa were reached the vessel content was heated to 70° C. Agitation, temperature and pressure were maintained for 5 hours. Then the vessel content was cooled down to 40° C. and filtrated first over a 10 micro Bag Filter followed by a 1 micro candle filter. To half of the filtered oil 2000 ppm of Herbalox were added.

(C2) Adsorption on Silica and Carbon 500 kg of raw marine oil were fed under nitrogen into a 1000 l vessel. To that 5% (w/w) Silika was added and agitation was started. The pressure in the vessel was reduced to 40 hPa. As soon as 100 hPa were reached the vessel content was heated to 70° C. Agitation, temperature and pressure were maintained for 2 hours. Then the pressure was set to normal and 2% of activated carbon were added. The pressure in the vessel was again reduced to 40 hPa. Agitation, a temperature of 70° C. and pressure were maintained for another 3 hours. The vessel content was then cooled down to 40° C. and filtrated first over a 10 micro Bag Filter followed by a 1 micro candle filter. To half of the filtered oil 2000 ppm of Herbalox were added.

(D) Counter Current Deodorization

PUFA oil was deodorized by a continuous counter current steam distillation (CCSD). Before the oil was fed into the deodorizer column the oil was degassed in a degassing unit at a temperature of 140° C. and a pressure of 40 hPa. After degassing the oil was further pre-heated in a heat exchanger to a temperature of 210° C. and then fed to the top of the deodorizing column. The column of the deodorizer had an inner diameter of 50 mm and was equipped with a structured packing (type Kühni Rombopak S6M). The length of the structured packing in the column was 4 m. Below the packing steam from a standard steam generation unit was continuously fed into the column. The pressure of the steam was about 4 bar (4000 hPa) and the temperature approx. 144° C. In the column itself a very low vacuum was maintained by a 3-stage vacuum pump unit. At the top of the column a pressure of 2 hPa was adjusted. By the counter current flow of the liquid oil phase and the steam gas phase smell giving components were stripped out of the oil. The mass flown of the oil amounted to 11 kg/h and the mass flow of the steam amounted to 0.1 kg/h. The deodorized oil was cooled down to 80° C. and finally three different antioxidants were added (tocopherol: 1000 ppm; ascorbyl palmitate: 250 ppm; citric acid: 25 ppm).

(E) Application of Food Oil in Milk (0.2%):
Preparation
Dissolve sodium ascorbate in a part of the milk
Add food oil to milk
Homogenise (2×; at 150 and 50 bar)
Fill milk into 200 ml bottles
Pasteurise (80° C. for 1 minute in the kernel)
Store in the fridge for 2 weeks

| Material | Control | FOOD OIL APPLICATION |
|---|---|---|
| Whole milk (3.8% fat) (g) | 450 | 398 |
| Skim milk (0% fat) (g) | 550 | 600 |
| PUFA oil (g) | — | 2.00 |
| Sodium ascorbate (g) | 0.25 | 0.25 |
| Total | 1000 | 1000 |
| Fat content | 1.71 | 1.71 |

(F) Application of Food Oil in Natural Yoghurt (Stirred Type)
Preparation
Heating of the milk to 30° C.
Addition of mixture of skim milk powder, stabiliser and sugar
Mixing
Heating to 65° C.
Addition of food oil
Homogenisation (65° C., 200 kg/cm$^2$, 2 minutes)
Pasteurisation (90° C., 15 minutes)
Cooling to 15° C.
Addition of natural yoghurt and mixing
Fermentation at 45° C. for 3-4 hours (pH 4.3)
Cooling and stirring shortly and vigorously
Filling of the mass into cups and closing
Storage at max. temperature of 5° C.

| Material | Control (g) | FOOD OIL APPLICATION (g) |
|---|---|---|
| Whole milk (3.8% fat) | 390 | 10 |
| Skim milk (0% fat) | 507 | 879 |
| Sugar | 50 | 50 |
| Stabiliser | 3 | 3 |
| Inulin | 5 | 5 |
| Nature yoghurt (0.1% fat) | 25 | 25 |
| Food oil | — | 8 |
| Total | 1000 | 1000 |

Sensory Evaluation:

As sensory method a profile test has been conducted. A sensory test provides the most useful information because it relates to the consumer acceptance of the food based on smell and taste. The method is very sensitive and provides information on flavour stability.

All samples were given to a trained taste panel. The sensory analysis was performed by means of descriptive analysis using internal scales in terms of different attributes. The interval scale consisted of 6 intervals, starting from level 1 for attribute "not detectable" up to level 7 for "extremely intense". An analysis of variance (ANOVA) was carried out to see if there is a significant difference. Multiple comparisons were made with the least significant difference test (L.S.D.) at 5% level of significance.

Quality of deodorized marine oils:

|  | Silika without Herbalox | Silika with Herbalox | Silika/Carbon without Herbalox | Silika/Carbon with Herbalox |
|---|---|---|---|---|
| FAST index | 1.5 | 1.0 | 1.0 | 1.0 |
| Rancimat 100° C./h | 2.6 | 5.4 | 2.8 | 6.4 |
| Milk application |  |  |  |  |
| Smell | 1.67 | 1.33 | 1.42 | 1.08 |
| Taste | 2.33 | 1.83 | 2.42 | 1.08 |

-continued

| | Silika without Herbalox | Silika with Herbalox | Silika/ Carbon without Herbalox | Silika/Carbon with Herbalox |
|---|---|---|---|---|
| Yoghurt application | | | | |
| Smell | 1.00 | 1.17 | 1.00 | 1.00 |
| Taste | 1.75 | 1.42 | 1.25 | 1.17 |

EXAMPLE 4

In analogy to the method described in Example 3 a trans-esterified marine fish oil from Ocean Nutrition, Canada (ONC), was deodorized. The EE75 fish oil ethyl ester from ONC had the following specification:

| | |
|---|---|
| Appearance: | yellowish oil |
| Colour (Lovibond red 5¼"): | max. 0.5 |
| Acid value: | max. 3.0 (mg KOH/g oil) |
| Peroxide value: | max. 5.0 (mEq/kg oil) |
| p-Anisidine value: | max. 20 |
| EPA content: | min. 42.0% |
| DHA content: | min. 22.0% |
| Total n-3 fatty acids: | min. 75.0% |

The invention claimed is:

1. A process for the preparation of a deodorized and stabilized food-grade marine oil which process comprises submitting a marine oil to a counter-current steam distillation (CCSD) in a thin film column containing a structured packing and, optionally, at least one antioxidant to the marine oil, wherein the thin film column containing a highly efficient structured packing is operated with a number of theoretical stages (NTS) of more than 10.

2. The process of claim 1, which comprises submitting the marine oils to the CCSD in the presence of at least one herbal extract deodorant.

3. The process of claim 1, wherein the counter-current steam distillation is continuous.

4. The process of claim 2, wherein the herbal extract deodorant is rosemary and/or sage extract.

5. The process of claim 1, wherein the process comprises adding at least one antioxidant to the marine oil which is selected from the group consisting of ascorbyl palmitate, tocopherol and citric acid.

6. The process of claim 1, wherein the marine oil comprises at least one polyunsaturated fatty acid (PUFA).

7. The process of claim 1, wherein the marine oil is a PUFA containing food oil or an alkyl ester.

8. The process of claim 1, wherein the distillation is run under a reduced distillation pressure of between 0.1 and 10 hPa.

9. A process for the production of a product rich in n-3 PUFA(s), from an intermediate food or its components, which comprises adding to a product an amount of the deodorized and stabilized food-grade marine oil obtained by the process according to claim 1 in the form of a liquid, an emulsion, a gel or a dry form containing a desired amount of n-3 fatty acid(s), dispersing the marine oil by intensive mixing and, optionally, further processing and post-processing the blend thus obtained into the desired product.

10. The process of claim 1, wherein the marine oil is a PUFA containing ethyl ester concentrate.

11. The process of claim 8, wherein the reduced distillation pressure is between 0.5 and 10 hPa.

12. The process of claim 11, wherein the reduced distillation pressure is between 1 and 5 hPa.

13. The process of claim 1, which comprises operating the CCSD at a steam temperature of between 140-160° C.

* * * * *